July 3, 1934.  H. V. SMITH ET AL  1,965,477
AUTOMOBILE INDICATOR
Filed May 21, 1928   3 Sheets-Sheet 1
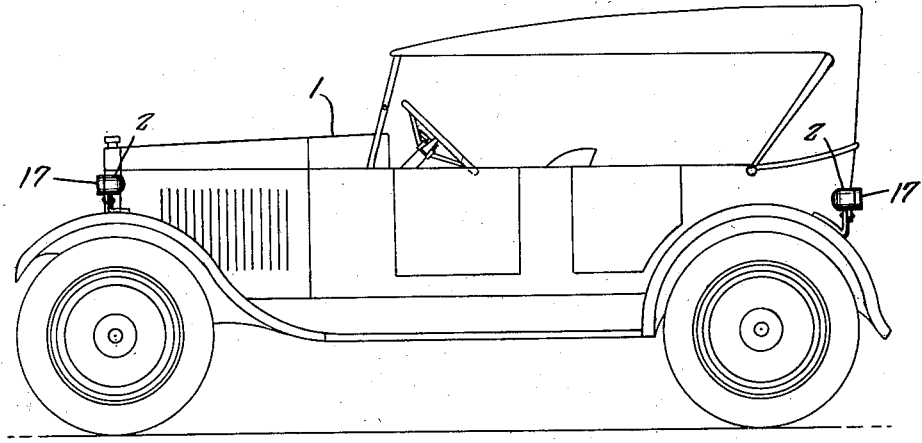
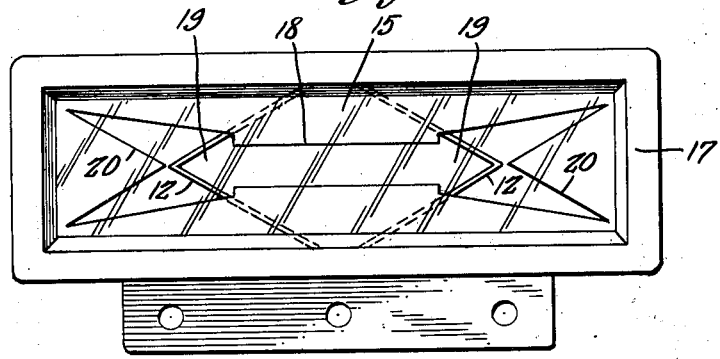
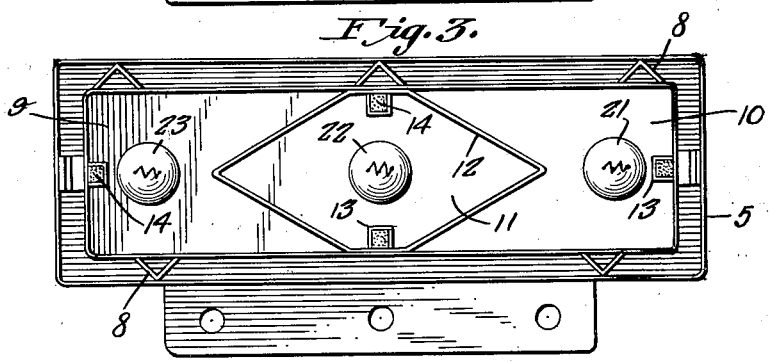
Harry V. Smith,
Howard McKinley, INVENTORS
BY Victor J. Evans
ATTORNEY

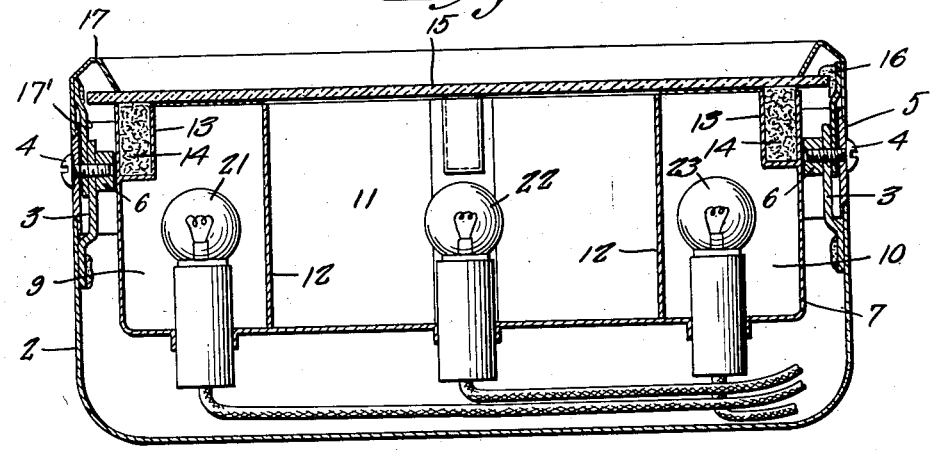
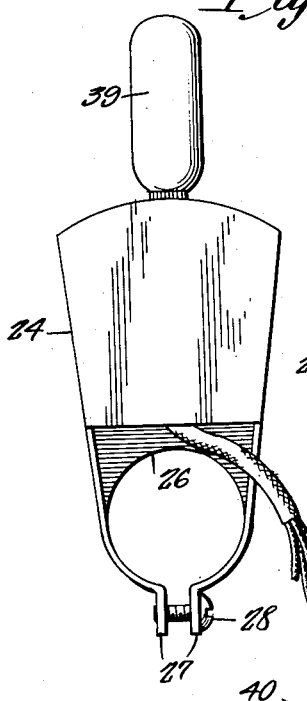

July 3, 1934.  H. V. SMITH ET AL  1,965,477
AUTOMOBILE INDICATOR
Filed May 21, 1928  3 Sheets-Sheet 3

Harry V. Smith,
Howard McKinley, INVENTORS
BY Victor J. Evans
ATTORNEY

Patented July 3, 1934

1,965,477

UNITED STATES PATENT OFFICE 1,965,477

AUTOMOBILE INDICATOR

Harry V. Smith and Howard McKinley,
Shubenacadie, Nova Scotia, Canada

Application May 21, 1928, Serial No. 279,490

1 Claim. (Cl. 177—327)

Our present invention has reference to an indicating signal designed to inform traffic and pedestrians as well as street crossing officers that the vehicle equipped with the signal is to take a course to the right or to the left as well as a warning signal that the vehicle is to stop or slow up.

The primary object of the invention is the provision of a signal for this purpose which includes a lamp house having direction symbols which will be illuminated by a novel switch construction located adjacent to the horn button on the steering wheel of the vehicle so that the driver with one hand can sound the horn and signal and thereby positively attract the attention of vehicles or pedestrians as to the course the vehicle is to pursue.

The features of our invention which we deem to be new and upon which we desire to secure patent protection will first be described and then particularly defined by the accompanying claim.

In the drawings:

Figure 1 is a side elevation of an automobile equipped with the improvement.

Figure 2 is a face view of the signal housing.

Figure 3 is a similar view with the face plate of the housing removed.

Figure 4 is an approximately central longitudinal sectional view through the housing.

Figure 5 is a plan view of a switch.

Figure 6 is an approximately central longitudinal sectional view therethrough.

Figure 7 is a sectional view on the line 7—7 of Figure 6.

Figure 8 is a sectional view approximately on the line 8—8 of Figure 6.

Figure 9:
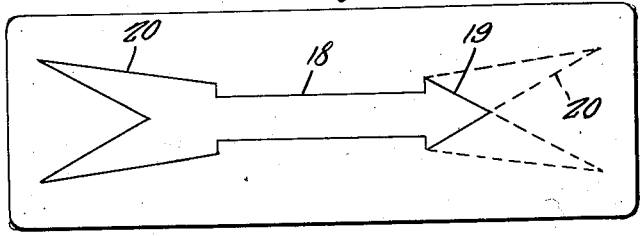
Figure 9 is a face view of a housing with the lamps in two of the compartments therein illuminated to show that the vehicle is to take a right hand turn.
Figure 10:
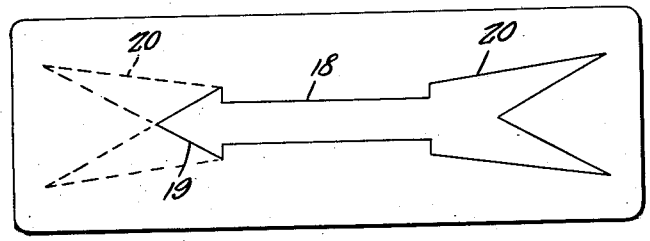
Figure 10 is a similar view showing the lamps in the central and in the second end compartment illuminated to show that the vehicle is to take a turn to the left.
Figure 11:
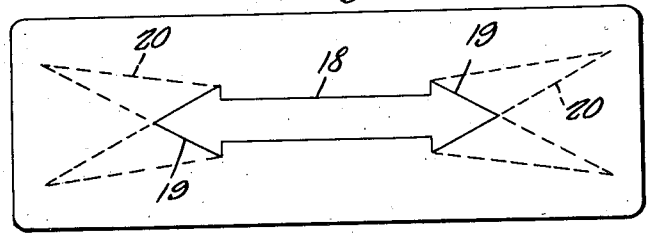
Figure 11 is a similar view with the lamp in the central compartment only illuminated to serve as a warning or stop signal.
Figure 12:
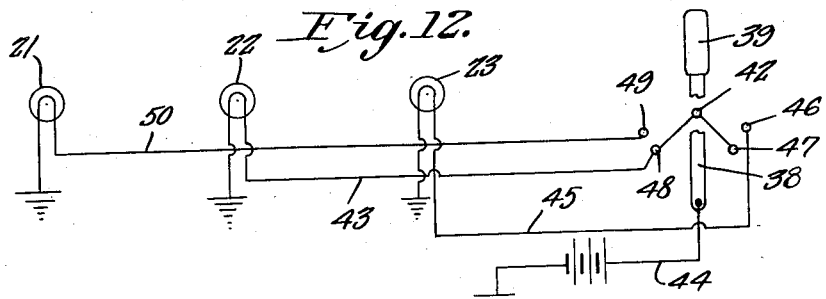
Figure 12 is a diagrammatic view of the electric wiring.

Our improved signaling device is preferably arranged both on the front and rear of an automobile 1, as illustrated by Figure 1 of the drawings. As both of the signals are of a similar construction a detail description of one is to be considered applicable to the other. The signals, of course, are suitably supported and each includes a housing 2 which is of a substantially rectangular formation but which has its rear corners rounded. Also, as best disclosed by Figure 4 of the drawings, the housing 2 comprises a rear inner cup-shaped portion having secured on its inner face outwardly extending arms 3 that receive therethrough bolts 4 that secure the outer section or ring member 5 to the inner section. The bolts also enter blocks 6 on the inner face of the arms 3, and these blocks are in frictional engagement with the outer walls of a lamp receptacle 7 which is arranged in the housing. The lamp receptacle is supported from the ring member 5 by the V-shaped spacers 8 between the receptacle and the ring member. The receptacle 7 is divided by suitable plates or partitions into end compartments 9 and 10 and a central compartment 11. These compartments are in the nature of reflectors and the central compartment is substantially diamond-shaped or at least has inwardly inclined V-shaped end walls 12. All of the compartments, adjacent to their outer ends have fixed on their walls box-like pockets 13, and each of these pockets is designed to receive therein a strip of compressible material 14. Preferably the strips 14 are of rubber and project through the pockets 13 to space the glass covering plate 15 from direct contact with the outer edges of the receptacle 7. Surrounding the edges of the glass plate 15 there is a gasket 16 which is also preferably of rubber, and frictionally engaging with or otherwise secured to the outer ring member 5 of the housing 2 there is a ring or rim 17 whose inner portion is flanged and whose edge contacts with the plate 15. Inwardly extending arms 17' on the ring 17 are apertured to receive the bolts 4 to detachably secure said ring to the outer section 5 of the housing 2.

The plate 15 is painted a dark color but is centrally provided with a transparent element. The central portion 18 of this transparent member is disposed over the central compartment 11 but is of a less length than the said compartment, so that the V-shaped edges provided by the compartment 11 form the central portion of the said transparent area with arrow-heads 19. The transparent area is, of course, widened to provide the inner edges of the heads 19, and from these portions the area is extended to provide fish tail portions 20 which are arranged over the respective end compartments 9 and 10.

In each of the reflector compartments there are lamp bulbs 21, 22 and 23, respectively, the lamp bulbs 21 and 23 being arranged in the end compartments.

Clamped around the housing for the horn button on the wheel of the automobile 1 there is our improved switch construction that controls the circuits for the lamp bulbs. As disclosed by Figures 5 and 6 of the drawings the switch includes a casing 24 whose outer edge is struck at a curvature and whose sides are inclined inwardly. The sides extend a suitable distance from the inner wall 25 of the casing. It should be stated that the casing is of metal and, therefore, embodies a natural resiliency, and also that the sides, below the end wall 25 of the casing, are rounded, as at 26. The portions of the sides projecting beyond the rounded or concaved wall 26 are rounded inwardly toward each other and merge into straight finger extensions 27. There is passed through a non-threaded opening in one of the fingers 27 and into engagement with the threads in an alined opening in the second finger 27 a headed binding bolt 28. By this arrangement it will be seen that the switch casing can be effectively and securely arranged upon the casing for the horn button and will be conveniently positioned with respect to the driver of the machine.

Resting on the inner wall 25 of the casing 24, and secured thereto, there is the straight branch 29 of a spring member. The ends of the branch 29 are extended and rounded or curved toward each other, as at 30, and 31, respectively. These spring arms 30 and 31 are limited in their movement toward each other by a block 32 that is secured in a depression 33 in a plate 34 of insulating material which is fixedly secured in the casing and is arranged at one side thereof. In the casing there is a second insulator block 35 that is spaced from the block 32.

Preferably and as disclosed by the drawings the casing 24 is made up of two suitably connected sections, and in the insulator block 34 there is screwed a headed bolt 36. On this bolt and contacting with the face of the block 34 there is a nut or like stop element 37 and pivotally mounted on the said block there is a metal switch arm 38, the said arm passing through an elongated slot 39' in the rounded top wall of the casing 24. The outer end of the switch arm 38 is provided with a handle 39 of insulating material. Arranged on the bolt and exerting a pressure between the head thereof and the switch blade 38 there is a coil spring 40. The spring 40 normally holds the blade in horizontal position so that the same will rest directly upon the block 32. The block 32, it will be noted as the description progresses, provides a fulcrum for the switch blade 38.

The block 34 is centrally formed, from the metal block 32, to the outer end of the said insulated block 34, with a groove or channel 41 whose inner wall is arranged at an angle and which has arranged therein a contact element 42 to which there is connected a conductor 43 that leads to the lamp bulb 22 in the central compartment 11, the return wire from the lamp bulb being grounded. To the pivot of the switch point there is connected the battery wire 44 of an electric circuit. A conductor 45 leads to the bulb 23 and the return wire for the said bulb is grounded. The conductor 45 has its ends secured to a contact element 46 that is secured on the block 34 in the casing. This contact element 46 is disposed opposite another contact element 47 that is in the circuit wire 43, and is, of course, connected to the contact 42. Also in the conductor 43 there is another contact 48 that is fixed on the insulator block 34 and this contact is disposed opposite another contact 49 at the end of a conductor 50 that leads to the bulb 21 in the compartment 9, the return wire for the said bulb being grounded.

Fixed on the insulator block 34 and disposed over the respective oppositely disposed contacts 46—47 and 48—49 there are curved guide springs 51. The spread ends of these springs are disposed below the outer face of the switch blade 38.

It is to be noted that the switch blade 38 is normally in neutral position, that is, the same is centralized by the springs 30 and 31 and influenced by the spring 40 to bring the same out of engagement with any of the contacts. If the vehicle is to stop or to give a warning signal to traffic in the rear thereof it is merely necessary for the operator, with his hand still on the steering wheel to exert a pressure against the handle 39 to cant the switch blade 38 to bring the same against the contact 42, when the lamp 22 in the intermediate reflector compartment 11 will be illuminated. If the vehicle is to take a turn to the right, the operator with his hand still on the steering wheel, swings the switch to cause one of the guide springs 51 to force the switch blade against the contacts 46 and 47. Thus the bulbs 22 and 23 will be illuminated and a full arrow will appear through the transparent area in the darkened plate 15 of the device to indicate that the vehicle is to take a turn to the right. By simply swinging the switch to its second angle position the second guide 51 will bring the blade against the contacts 48 and 49, to illuminate the lamp in the central compartment and the lamp 21 in one of the end compartments to display a full arrow through the transparent area in the plate 15, which points to the left. The spring switch plate is returned to neutral position by the springs 30 and 31. When swung in one direction only one of the springs 30 or 31 is tensioned and when the hand of the operator releases the handle 39 this tension spring will return the switch blade to its initial neutral position and the second spring 30 or 31, will serve as a buffer element when the switch blade is so influenced.

The construction, operation and advantages of our improvement will, it is thought, be understood and appreciated without further detailed description, but obviously we do not wish to be restricted to the precise details herein set forth and, therefore, hold ourselves entitled to make such changes therefrom as fairly fall within the scope of what we claim.

Having described the invention, we claim:

An automobile indicator comprising a housing open at one end, outwardly extending arms secured to the inner face of the housing, an open-faced lamp receptacle arranged in the housing and spaced and projecting outwardly therefrom, an outer ring section engaging the outer edges of the housing and spaced from the receptacle, means whereby the ring section will support the receptacle, a closure for the receptacle, a rim overlying the ring section and engaging the closure, arms carried by the rim and overlapping the first named arms, fasteners extending through the ring section and the arms, and spacing blocks engaged by the fasteners and positioned between the inner of said arms and the receptacle to aid in maintaining the latter in spaced relation to the housing and ring section.

HARRY V. SMITH.
HOWARD McKINLEY.